(12) United States Patent
Stoevesandt et al.

(10) Patent No.: US 11,048,229 B2
(45) Date of Patent: Jun. 29, 2021

(54) METHOD AND SYSTEM FOR PRODUCING BLADES OF A MACHINE INTERACTING WITH A FLUID

(71) Applicant: Fraunhofer-Gesellschaft zur Förderung der angewandten Forschung e.V., Munich (DE)

(72) Inventors: Bernhard Stoevesandt, Bremen (DE); Matthias Schramm, Nuremberg (DE); Florian Sayer, Bremen (DE); Heiko Rosemann, Bremerhaven (DE); Christian Dörsch, Bremen (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 142 days.

(21) Appl. No.: 16/329,964

(22) PCT Filed: Aug. 30, 2017

(86) PCT No.: PCT/EP2017/071764
§ 371 (c)(1),
(2) Date: Mar. 1, 2019

(87) PCT Pub. No.: WO2018/041896
PCT Pub. Date: Mar. 8, 2018

(65) Prior Publication Data
US 2019/0204809 A1 Jul. 4, 2019

(30) Foreign Application Priority Data
Sep. 2, 2016 (DE) ...................... 10 2016 216 612.3

(51) Int. Cl.
*G05B 19/40* (2006.01)
*B23C 3/18* (2006.01)
(Continued)

(52) U.S. Cl.
CPC ............ *G05B 19/4099* (2013.01); *B23C 3/18* (2013.01); *G05B 19/41875* (2013.01);
(Continued)

(58) Field of Classification Search
CPC ................ Y02E 10/72; G05B 19/4099; G05B 19/41875; G05B 2219/32189;
(Continued)

(56) References Cited

U.S. PATENT DOCUMENTS

| | | | | |
|---|---|---|---|---|
| 4,582,013 A | * | 4/1986 | Holland, Jr. ............. | B63H 9/02 114/39.3 |
| 2011/0164985 A1 | * | 7/2011 | Brown ................... | F03D 1/0608 416/223 R |
| 2016/0017866 A1 | * | 1/2016 | Craft ....................... | F03D 17/00 348/46 |

FOREIGN PATENT DOCUMENTS

| DE | 102010055775 A1 | 6/2012 |
|---|---|---|
| DE | 102012213481 A1 | 2/2014 |

(Continued)

OTHER PUBLICATIONS

"European Application Serial No. 10 2016 216 612.3, Examination Report dated Jun. 22, 2017", (dated Jun. 22, 2017), 5 pgs.
(Continued)

*Primary Examiner* — Michael J Brown
(74) *Attorney, Agent, or Firm* — Schwegman Lundberg & Woessner, P.A.

(57) ABSTRACT

The invention relates to a method and to system for producing blades (1) of a machine interacting with a fluid, in particular a fluid-driven machine, in particular a wind turbine, comprising an examination device (19) for determining geometric deviations (A, B, C, D, E, F) from a target shape for one or more shaped blades (1), a device (21) for determining a deviation evaluation of one or more determined geometric deviations from the target shape for each (Continued)

blade with respect to the aerodynamic and/or mechanical consequences thereof, a device (23) for assigning one or more corrective measures (100, 101, 102), each including an expenditure evaluation (100", 101", 102"), to one or more determined geometric deviations (A, B, C, D, E, F) from the target shape for each blade, and a linking device (24) for linking a deviation evaluation that was determined for one or more of the determined geometric deviations to the expenditure evaluation for one or more determined corrective measures and for determining the corrective measures to be carried out from the result of the linkage.

20 Claims, 4 Drawing Sheets

(51) Int. Cl.
  *G05B 19/4099* (2006.01)
  *G05B 19/418* (2006.01)
  *G05B 19/41* (2006.01)

(52) U.S. Cl.
  CPC .............. *G05B 2219/32189* (2013.01); *G05B 2219/32217* (2013.01); *G05B 2219/32218* (2013.01); *G05B 2219/35134* (2013.01); *G05B 2219/37205* (2013.01); *G05B 2219/37576* (2013.01); *G05B 2219/37617* (2013.01); *G05B 2219/45147* (2013.01); *G05B 2219/50207* (2013.01); *Y02E 10/72* (2013.01); *Y02P 90/02* (2015.11)

(58) Field of Classification Search
  CPC .......... G05B 2219/32217; G05B 2219/32218; G05B 2219/35134; G05B 2219/37205; G05B 2219/37576; G05B 2219/37617; G05B 2219/45147; G05B 2219/50207; Y02P 90/02
  USPC .......................................................... 700/98
  See application file for complete search history.

(56) References Cited

FOREIGN PATENT DOCUMENTS

| DE | 102013226422 B3 | 2/2015 |
|---|---|---|
| EP | 2816430 A1 | 12/2014 |
| WO | WO-2011044565 A1 | 4/2011 |

OTHER PUBLICATIONS

"International Application Serial No. PCT/EP2017/071764, International Search Report dated Jan. 15, 2018", (dated Jan. 15, 2018), 3 pgs.

"International Application Serial No. PCT/EP2017/071764, Written Opinion dated Jan. 15, 2018", (dated Jan. 15, 2018), 11 pgs.

\* cited by examiner

METHOD AND SYSTEM FOR PRODUCING BLADES OF A MACHINE INTERACTING WITH A FLUID

PRIORITY APPLICATIONS

This application is a U.S. National Stage Filing under 35 U.S.C. 371 from International Application No. PCT/EP2017/071764, filed on Aug. 30, 2017, and published as WO2018/041896 on Mar. 8, 2018, which claims the benefit of priority to German Application No. 10 2016 216 612.3, filed on Sep. 2, 2016; the benefit of priority of each of which is hereby claimed herein, and which applications and publication are hereby incorporated herein by reference in their entirety.

The invention resides in the fields of mechanical engineering, manufacturing engineering and logistics and relates to a method and to a system for producing blades of a machine.

Particularly advantageously, the method and the system can be used for blades of machines that interact with a fluid, which is to say a gas or a liquid, for example, and in particular for blades of air-driven or gas-driven machines, such as wind turbines. However, the method can also be used for machines in which the blades, in turn, drive a fluid, such as in marine propulsion systems comprising propellers, and in compressors.

Specifically, however, the method and the system according to the invention were developed for the use with wind turbines.

Blades or rotor blades of wind power plants or individual wind turbines are designed taking the aerodynamic and the mechanical-dynamic conditions into consideration. In particular, the load from typically assumed wind speeds is also relevant in this regard, as are the required efficiency and output of the wind power plant.

The properties of an individual blade/rotor blade depend heavily on the outer shape of the blade. In production, efforts are made to reproducibly manufacture blades in the desired and designed shape; however, deviations from the target shape occur on a regular basis. This results in reduced output of the machine and/or the risk that a blade will not permanently withstand the mechanical-dynamic loads.

It is possible, within certain boundaries, to reduce, or partially eliminate, deviations from the target shape on a blade by way of a finishing operation. Such a method is known from EP 2816430 A1, for example. There, a three-dimensional image of a manufactured blade is generated, deviations from the target shape are identified, and these are eliminated by way of a finishing operation.

From DE 10 2010 055 775, a method for repairing gas turbine components is known, in which the effect that a repair has on the operation of the gas turbine is first determined by calculation.

From DE 10 2013 226 422 B3, a method for the automated evaluation of blades of an aerodynamic machine is known.

DE 10 2012 213 481 A1 teaches a method for improving the quality in the production of workpieces. In an evaluation step, the effect of a planned machining step, which has not yet been carried out, is already considered in the calculation.

Measuring the blades, identifying deviations and eliminating deviations from the target shape are very complex and expensive steps, so that the expenditure is not always economically worthwhile in relation to the benefit.

Against the background of the prior art, it is the objective of the present invention to create a method and a system for producing blades, enabling as efficient finishing as possible.

The object is achieved by a method having the features of either claim 1, 2 or 3 and by a system having the features of claim 12. Claims 4 to 11 show advantageous embodiments of the invention.

Accordingly, the invention relates to a method for producing blades of a machine interacting with a fluid, in particular a fluid-driven machine, in particular a wind turbine, wherein one or more blades are shaped, geometric deviations from a target shape are determined in an examination step for one or more shaped blades, a respective first deviation evaluation is assigned to one or more determined geometric deviations from the target shape for each blade with respect to the aerodynamic and/or mechanical consequences thereof, one or more possible corrective measures, each including an expenditure evaluation, are assigned to one or more determined geometric deviations from the target shape for each blade, and for one or more of the determined geometric deviations the deviation evaluation is, or the deviation evaluations are, linked to the expenditure evaluation, or the expenditure evaluations, and the corrective measures to be carried out are determined from the result of the linkage.

This method offers the option of expedient and effective quality control, which allows the effects of deviations of the blades from the target shape to be evaluated, wherein the deviations can be juxtaposed against the expenditure that arises from the corrective measures. Such a method allows the need for individual corrective measures and the contribution they can provide to an improvement in the shape of a blade to be juxtaposed against one another, so that corrective measures can be systematically prioritized. In doing so, not all deviations from the target shape necessarily have to be corrected on the blades, whereby the expenditure for the correction can be significantly reduced. Such a method can nonetheless ensure that a particular, established standard with respect to the performance capability of a machine is achieved, with minimized expenditure for the correction. This standard can, as will be described in greater detail hereafter, be set and defined in a variety of ways. For example, it can be ensured for an individual blade that each individual deviation from the target shape, with respect to the aerodynamic or mechanical-dynamic effects thereof, remains below a certain threshold or is brought below this threshold by way of a corrective measure. However, it may also be provided that the sum of the deviations of a blade from the target shape satisfies certain conditions. By selecting corrective measures, this can also be ensured for a blade for which the deviations initially do not meet the standard.

By way of the method according to the invention, it is thus possible to systematically ensure a quality standard for blades of machines that interact with a fluid. The standard can be individually established in each case for the production of a certain set of blades as desired by the manufacturer.

The invention furthermore relates to an alternative method for producing blades of a fluid-driven machine, in particular a wind turbine, wherein one or more blades are shaped, geometric deviations from a target shape are determined in an examination step for one or more shaped blades, a respective first deviation evaluation is assigned to one or more determined geometric deviations from the target shape for each blade with respect to the aerodynamic and/or mechanical consequences thereof, one or more possible corrective measures, each including an expenditure evaluation, are assigned to one or more determined geometric deviations from the target shape for each blade, a respective second deviation evaluation is assigned to determined geometric deviations for each blade with respect to the aerodynamic and/or mechanical consequences thereof, taking the possible correction into consideration, and for one or more of the determined geometric deviations the second deviation evaluation is, or the second deviation evaluations are, or the first and second deviation evaluations are linked to the expenditure evaluation, or the expenditure evaluations, and the corrective measures to be carried out are determined from the result of the linkage or the linkages.

In this method, in the event of a deviation from the target shape, the evaluation of individual corrective measures is not only based on the degree of the deviation of the actual shape from the target shape, but specifically also on the improvements achievable by the corrective measures. In this, it is considered that it is possible that not all deviations from the target shape can be completely eliminated by the corrective measures. Some deviations may be eliminated only partially by corrective measures, so that such deviations can be partially remedied, while deviations from the target shape remain or are not entirely eliminated in the corresponding areas of the blade. In this case, the meaningfulness of corrective measures can be measured based on the extent to which the deviations from the target shape can be eliminated and/or to what degree the target shape can be achieved by the corrective measures.

In a further embodiment, the invention relates to a method for producing blades of a fluid-driven machine, in particular a wind turbine, wherein multiple blades are shaped, geometric deviations from a target shape are determined in an examination step for multiple shaped blades, a respective first deviation evaluation is assigned to one or more determined geometric deviations from the target shape for each blade with respect to the aerodynamic and/or mechanical consequences thereof, one or more possible corrective measures, each including an expenditure evaluation, are assigned to one or more determined geometric deviations from the target shape for each blade, and for one or more of the determined geometric deviations the deviation evaluation is linked to the expenditure evaluation, and groups of two or more blades, for which the expenditure evaluation exceeds an established threshold and a mechanical and/or an aerodynamic unbalance is similar, are formed from the result of the linkage for a shared use in a wind turbine.

This variant of the method takes into consideration that it is also possible to decide to entirely refrain from or drastically limit corrective measures in such a way that the desired quality standard is not achieved, or a lesser quality standard is achieved, despite corrective measures, taking into consideration the deviations from the target shape and/or the limited options to fully implement the target shape by way of the corrective measures. In this case, the blades thus assessed can be used for another purpose, for example used jointly in a machine that has to satisfy lower performance requirements, or the blades can be assembled into groups for a machine in such a way that the aerodynamic and/or mechanical unbalances thereof at least partially compensate for one another.

An advantageous embodiment of the above-described methods can provide that a quotient is found of at least one expenditure evaluation and at least one deviation evaluation when linking the deviation evaluation to the expenditure evaluation. Finding the quotient is a mathematically simple way to juxtapose the correction expenditure against the benefit achieved thereby or against the initially present deviation from the target shape. When finding a quotient this way, both the deviation evaluation and the expenditure evaluation can be provided with a power greater or smaller than one, so as to implement a non-linear evaluation.

Furthermore, it may be provided that, in the determination of the deviation evaluation, a difference of an aerodynamic value is assigned to a respective geometric deviation from the target shape based on an existing aerodynamic model by way of a differential change.

In principle, it is possible to calculate the aerodynamic shape and effect once for the target shape, and once for the shape actually determined during the measurement, and to compare these. In this way, the effect of a deviation from the target shape which is similar to a mechanical and/or an aerodynamic unbalance can be determined. This requires substantially complete aerodynamic calculations based on the target shape and the actually measured shape.

However, as mentioned above, it is also possible to carry out abbreviated calculations by using only the differences/deviations from the target shape in a calculation model and approximately calculating the effects of the deviations.

For example, it can also be provided that longitudinal sections of a blade are each considered and assessed separately in the deviation evaluation of the geometric deviation from the target shape.

As an alternative or in addition, it can also be provided that various longitudinal sections of a blade are weighted differently in the deviation evaluation of the geometric deviation from the target shape. This is impacted by the fact that deviations from the target shape have a greater effect in those sections of a blade that, assuming a use in a rotating machine, undergo motions in regions lying further away from the axis than deviations located in regions close to the axis. Accordingly, detected deviations can be weighted in a linear or superlinear fashion based on the distance at which these are located in relation to the rotational axis.

This applies in particular to the consideration of the aerodynamic aspect. With respect to the consideration of mechanical aspects, it may be that the regions located closer to the axis are subjected to greater mechanical loads than the regions lying furthest way from the axis, so that an increase in the weighting can be considered in these situations as the distance in relation to the rotational axis decreases.

For individual deviations of a blade from the target shape, a degree of deviation can be determined, which can depend, for example, on the affected surface area of the surface of the blade, or also on the depth of the deviation, measured from the target surface of the blade. The degree of the deviations can also be evaluated differently for aerodynamic effects than for the mechanical effects. Mechanical and aerodynamic effects can be considered jointly, but also separately from one another.

It can also be provided that respective deviations on the pressure side and on the suction side (on the two effective sides) of a blade can be weighted differently in the deviation evaluation of the geometric deviation from the target shape. Furthermore, it can be provided that a joint deviation evaluation of the sum of the detected deviations is compared to one or two established threshold values. The individual deviations can be weighted identically or differently and can be added up, for example. The joint deviation evaluation can then be categorized for a blade in such a way that it is determined whether this is within a predefined value window, which is to say between a lower and a higher threshold value. If the deviation evaluation is outside the evaluation window, which is to say below the lower or above the upper threshold, for example, a decision can be made, for example, that corrective measures are possible and/or necessary. It is also possible to establish a threshold value that, when exceeded, no longer makes corrective measures expedient.

It is also possible to carry out an appropriate examination of threshold values for juxtaposing the expenditure evaluation against the deviation evaluation, so as to determine or check the efficiency of corrective measures and the meaningfulness thereof.

It may also be provided in the method that the deviation evaluation is determined in the form of a load deviation of the wind turbine caused by the geometric deviation from the target shape under defined conditions. This allows the load and/or the additional load to which a wind turbine or another machine is subjected under given outside conditions to be determined. If this load exceeds a permissible threshold value, the machine cannot be used for the corresponding conditions according to the given standard, and corrective measures must be carried out, or the corresponding blade must be used for another purpose.

It may also be provided that the deviation evaluation is determined in the form of a performance deviation of the wind turbine caused by the geometric deviation from the target shape under defined conditions. In this case, the performance achieved by the machine with the given deviations is determined and compared to the conditions when a target shape is adhered to. If the performance deviation is too great, and if the deviation exceeds a certain threshold established by the standard, corrective measures must be carried out, or the blade must be used for another purpose.

It may also be provided that the deviation evaluation is determined in the form of an added-up energy difference over a defined operating time of the wind turbine caused by the geometric deviation from the target shape. In this case it is checked whether, for example, a wind turbine, added up within a predefined period of time, is able to generate a certain given amount of energy or whether the wind turbine remains below a certain threshold of the energy that can be generated as a result of the deviations from the target shape. The energy that can be generated in the period of time can be easily converted into an economic benefit, so that the corrective measures that may potentially have to be carried out, which can likewise be evaluated in terms of cost, can be juxtaposed against the economic losses that occur during operation within a predefined time if no corrective measures are carried out.

It may be provided, for example, that the expenditure evaluation is determined in the form of a cost expenditure or a time expenditure or a linkage of a time expenditure to a cost expenditure. It may furthermore be provided that the expenditure evaluation is non-linear by taking the savings resulting from corrective measures that are combined with one another into consideration in the determination of the overall expenditure of the corrective measures.

For the practical implementation in the determination of the deviations of an actual blade from a target shape, it may be provided that the respective blade is scanned three-dimensionally in the determination of the geometric deviations from a target shape, and a representation of the blade is stored in a data processing system. For this purpose, a scan can be carried out by way of a laser, for example. So as to achieve a three-dimensional map/representation, it is also possible to carry out a scan, using one or more lasers, from various positions relative to a blade. The actual blade geometry can also be recorded manually or by way of other known scanning methods. The recording can take place in a raster, which ensures the spatial resolution required for this purpose.

In addition to a method of the type described above, the invention also relates to a system for producing blades of a machine interacting with a fluid, in particular a fluid-driven machine, in particular a wind turbine, comprising an examination device for determining geometric deviations from a target shape for one or more shaped blades, a device for determining a deviation evaluation of one or more determined geometric deviations from the target shape for each blade with respect to the aerodynamic and/or mechanical consequences thereof, a device for assigning one or more corrective measures, each including an expenditure evaluation, to one or more determined geometric deviations from the target shape for each blade, and a linking device for linking a deviation evaluation that was determined for one or more of the determined geometric deviations to the expenditure evaluation for one or more determined corrective measures and for determining the corrective measures to be carried out from the result of the linkage.

The method and the system, as they were described above, allow systematic quality management in the series production of blades of machines, and in particular of wind power machines.

The invention will be shown and described hereafter based on exemplary embodiments in figures of a drawing. In the drawings:

FIG. 1 in a cross-section schematically shows a blade of a wind power plant;

FIG. 2 in a cross-section shows a blade having elevations deviating from the target shape;

FIG. 3 in a cross-section shows a blade having recesses deviating from the target shape;

FIG. 4 schematically shows parts of a wind power plant;

Figure 1:
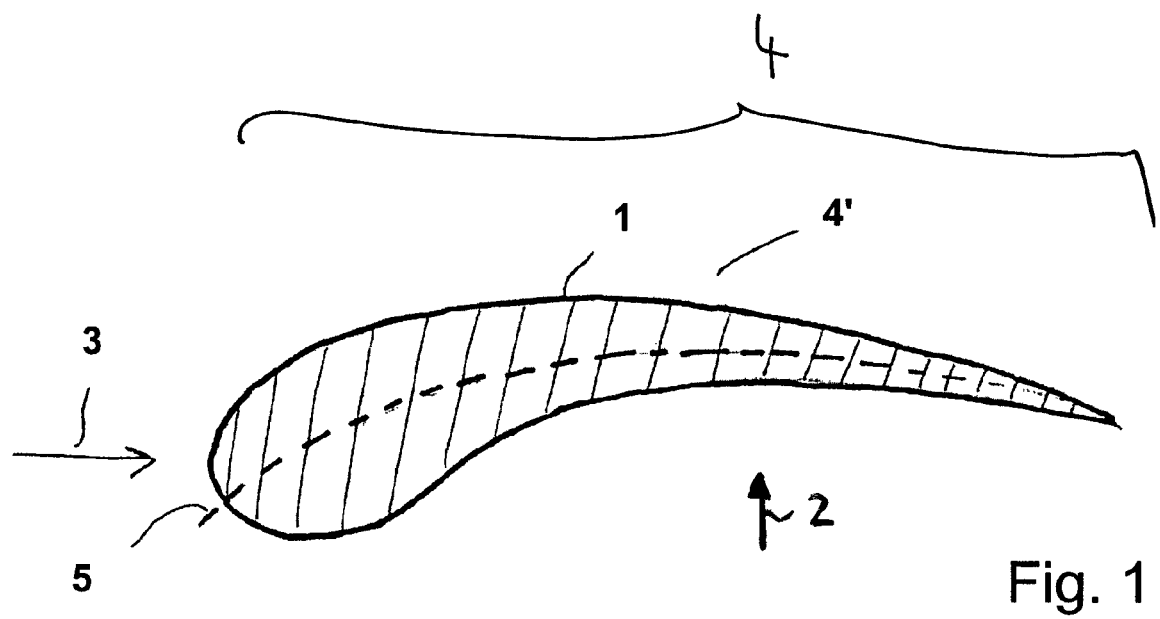

FIG. 1 schematically shows a section perpendicular to the longitudinal axis of a blade of a wind power plant in a target shape. The airfoil profile of the blade 1 can be seen, wherein the wind direction is indicated by the arrow 2 and the incident flow direction is indicated by the arrow 3. The suction side of the blade is denoted by the curly bracket 4, wherein the suction side 4 is separated from the pressure side by the dotted line 5. The pressure side of the blade is located opposite the suction side 4.

The incident flow direction 3 results from the wind direction 2 and the direction of movement of the driven blade 1.

Figure 2:
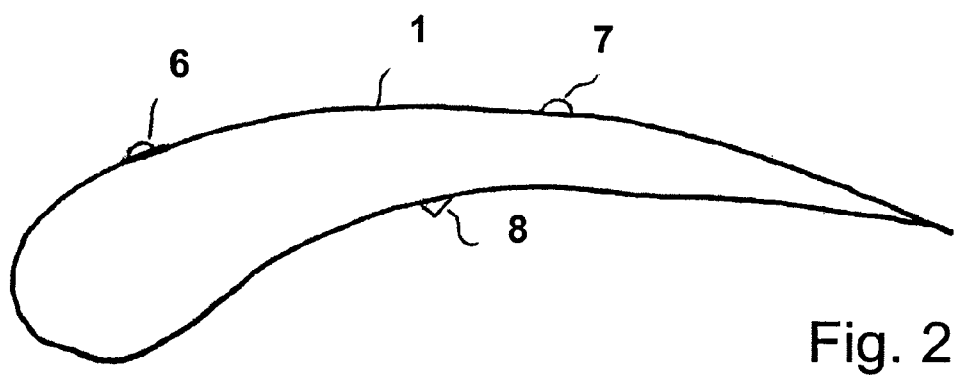

FIG. 2 schematically shows a cross-sectional view of a blade 1, which can be produced in a casting process using a casting mold, for example. Elevations 6, 7, 8 may result as deviations from the ideal target shape, as it is shown in FIG. 1, which can develop both on the suction side and on the pressure side of the blade, for example due to runners, joints of casting molds or irregularities when removing a blade from the casting mold. The deviations 6, 7, 8 can have the shape of locally delimited, hill-like elevations or the shape of webs (caused by joints of casting molds, for example).

Figure 3:
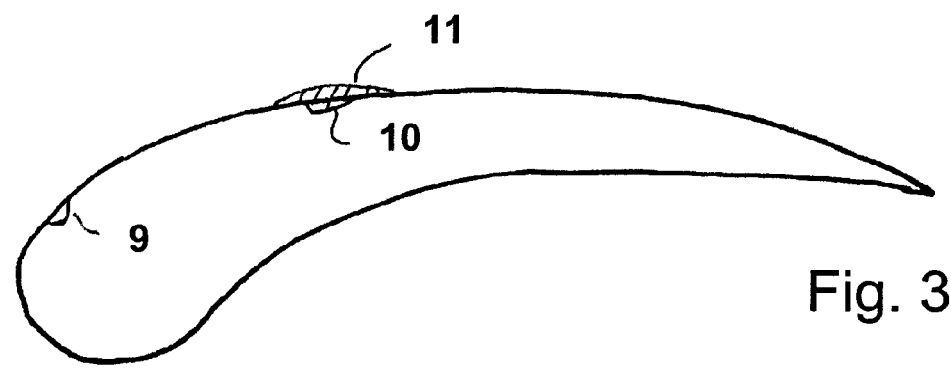

FIG. 3 shows deviations 9, 10 in the form of depressions, holes or recesses by way of example based on a cross-section of a blade 1.

In the simplest case, corrective measures for eliminating the deviations 6, 7, 8, 9, 10 can provide, for example, that elevations 6, 7, 8 are removed by way of grinding and that depressions 9, 10 are filled in using a knifing filler 11. After the filling with a knifing filler, the contour of the blade can be adapted to the target shape by way of grinding, milling or other machining processes.

However, other corrective measures are also conceivable. For example, it is possible to grind off elevations on a larger surface area so as to make the transitions on the surface of the blade as even as possible. Depressions 9, 10 can also initially be deepened and then filled in so as to ensure enhanced adhesion of a knifing filler. For machining, it is also possible to combine multiple deviations and grind and fill these in together. It can also be provided that recesses are specifically provided in a blade in the region of deviations, which are filled by insert parts. The insert parts can be glued in and subsequently be filled in and ground.

The filling in of material can also take place by applying additional material layers, spray-up molding or casting application.

It is the object of the present invention to initially evaluate deviations found on one or more blades, so as to establish the mechanical and/or aerodynamic effects of these deviations during operation, whether the deviations can be eliminated by corrective measures, the expenditure of the corrective measures, either individually or combined in groups, and how the expenditure of the corrective measures relates to the effects of the deviations. It can also be taken into consideration to what extent the proposed corrective measures can come close to the target state/the target shape of the blade at the given deviations. For example, if the deviations can be corrected only partially, the expenditure of the corrective measures are to be juxtaposed against the achievable success and the remaining residual deviations from the target shape, and it is to be evaluated whether an established standard for the permissible deviations from the target shape is even achieved, and whether the expenditure that is required for the corrective measures is economically worthwhile in relation to the achievable benefit. Based on such an analysis, it is then possible to prioritize the corrective measures, and to carry out the most effective corrective measures having the least necessary expenditure first. A list can be generated, which sorts the corrective measures by priority, and this list can be worked through until the overall deviation of a blade from the target shape achieves a value that is still permissible according to the set standard.

Figure 4:
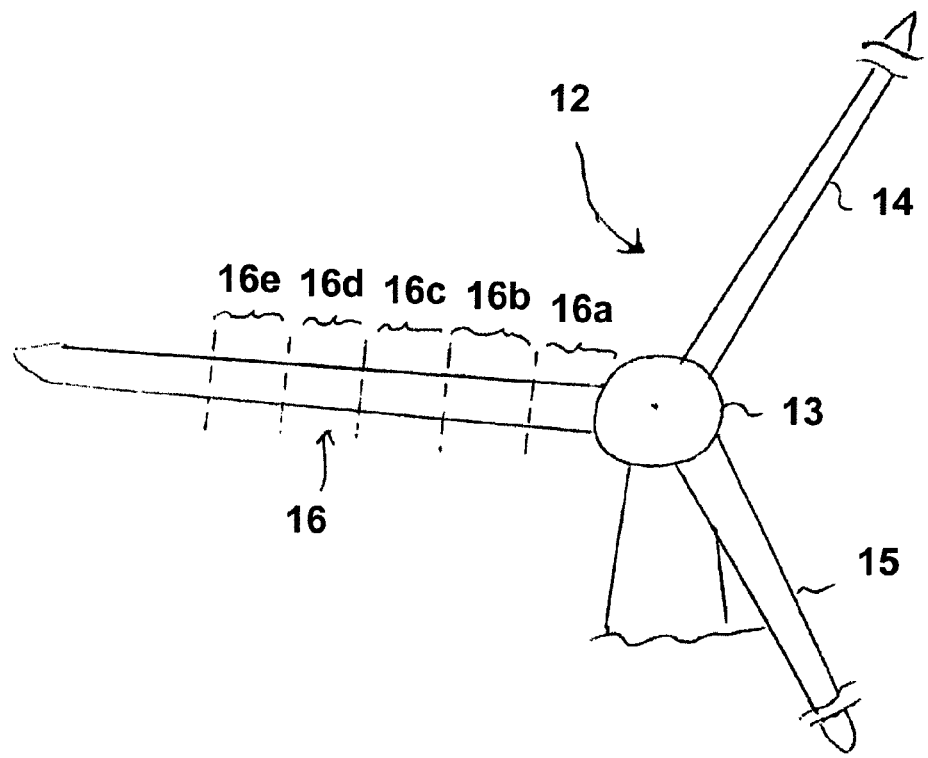

FIG. 4 schematically shows a portion of a wind power plant comprising a rotor 12, the one hub 13 and three blades 14, 15, 16. By way of example, a longitudinal division into sections 16a, 16b, 16c, 16d, 16e is shown on the blade 16. For example, information indicating the longitudinal sections of the blade in which the respective deviations are located can be included in the evaluation of the deviations of the blade 16 from the target shape. Deviations in positions located further to the radial outside at a greater distance from the hub 13 are appraised more strongly than deviations located further to the radial inside. Due to the higher incident flow velocity, a deviation in the section 16e affects the performance of a wind power plant more strongly than a deviation in the section 16a in the vicinity of the hub. The relevance of the individual deviations, however, essentially also depends on the shape and size of the deviations, such as elevations or recesses.

Figure 5:
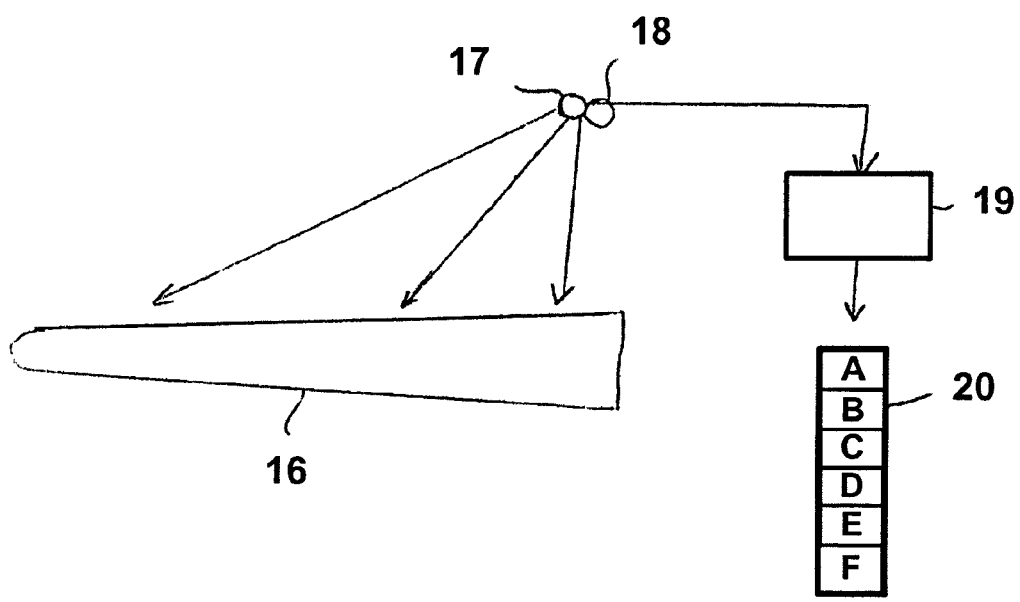
FIG. 5 shows a device for scanning a blade.

FIG. 5 schematically shows a device for detecting the three-dimensional shape of a blade 16, comprising a light source 17, which can be formed by a laser, for example, and a scanning device 18 for detecting the reflections of the laser light. The scanning data is forwarded to an analysis device 19, which determines the three-dimensional actual shape of the blade 16 from the data, and compares this to a target shape. The difference is output in the form of a vector or a matrix 20, which contains the deviations A, B, C, D, E, F, the respective positions thereof on the blade 16, and the respective geometric shape and size thereof. This vector is thereafter further processed.

Figure 6:
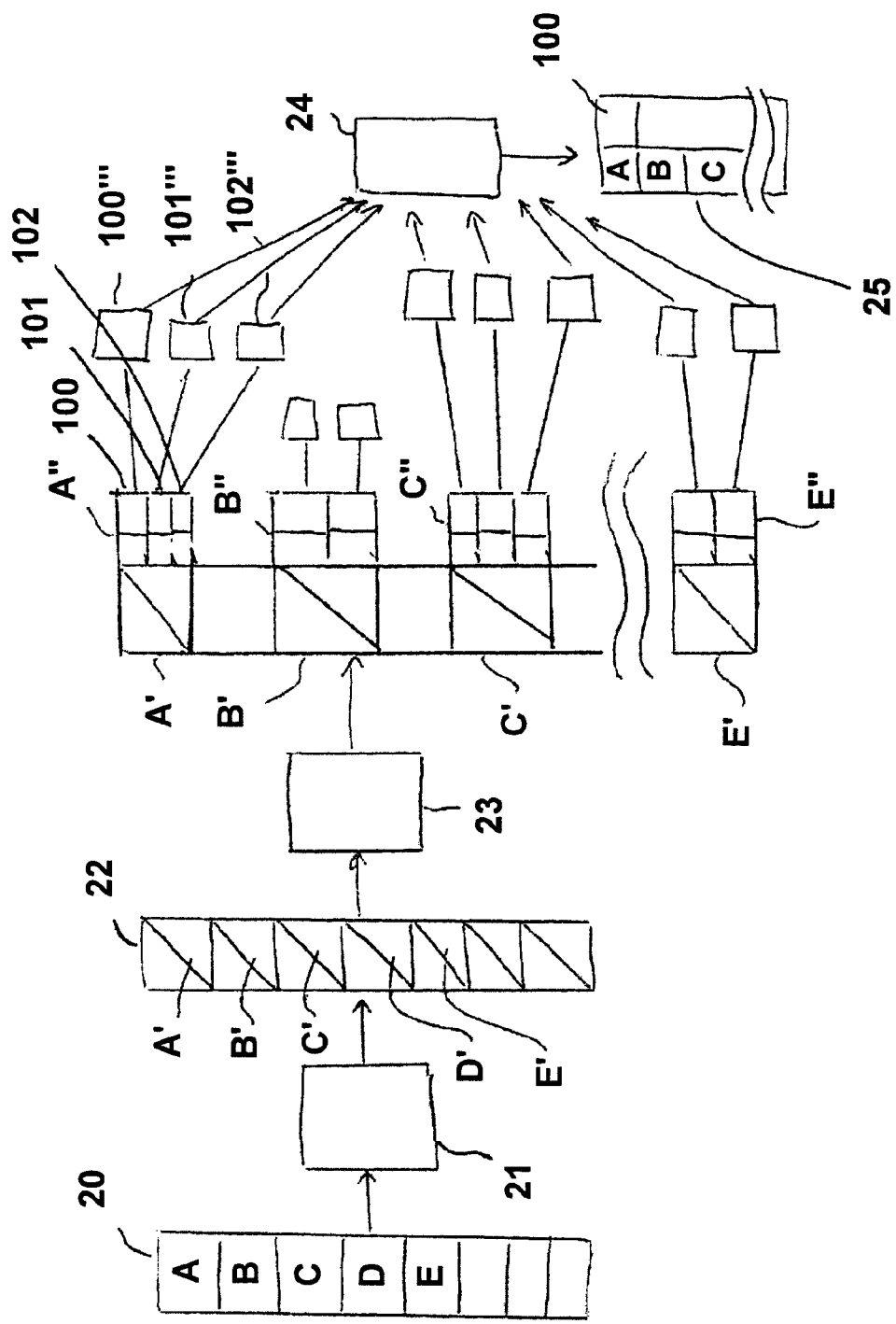
FIG. 6 shows a system for evaluating deviations and corrective measures.

FIG. 6 shows that the vector A, B, C, D, E, F, which in FIG. 6 is denoted by reference numeral 20, is further processed in the device 21 for determining a deviation evaluation. In the device 21, a deviation evaluation A', B', C', D', E', F' is individually assigned to the individual local deviations A, B, C, D, E, F of a blade, or optionally also of multiple blades, wherein the geometric size and type of the deviation and the position of the deviation on the respective blade can be taken into consideration and processed into a deviation evaluation. The deviation evaluation can represent a value for each individual deviation which can be obtained, for example, by comparing the aerodynamic properties of the blade to the deviation having the corresponding aerodynamic properties without such a deviation, which is to say when the target shape is adhered to.

The deviation can also be determined taking the mechanical consequences, such as breaking strength and flexural strength, into consideration, or it is possible to link parameters of the mechanical strength to aerodynamic parameters.

For example, the degree to which the aerodynamic properties change as a result of a deviation can be determined by processing the parameters of the deviation using a numerical simulation-based method, which determines the change in aerodynamics as a result of the determined deviations in the geometry locally on the cross-sectional profile or in the overall geometry of the blade. A differential calculation method can be employed for this purpose, which does not recalculate the aerodynamic properties of the entire blade for a deviation, but only approximately determines effects of a deviation on aerodynamics.

The result of the determination of the deviation evaluation is a vector 22, which assigns the corresponding evaluation A' to a respective deviation A. The individual deviations can be present disordered in the vector or be prioritized according to the level of the evaluation thereof.

Figure 7:
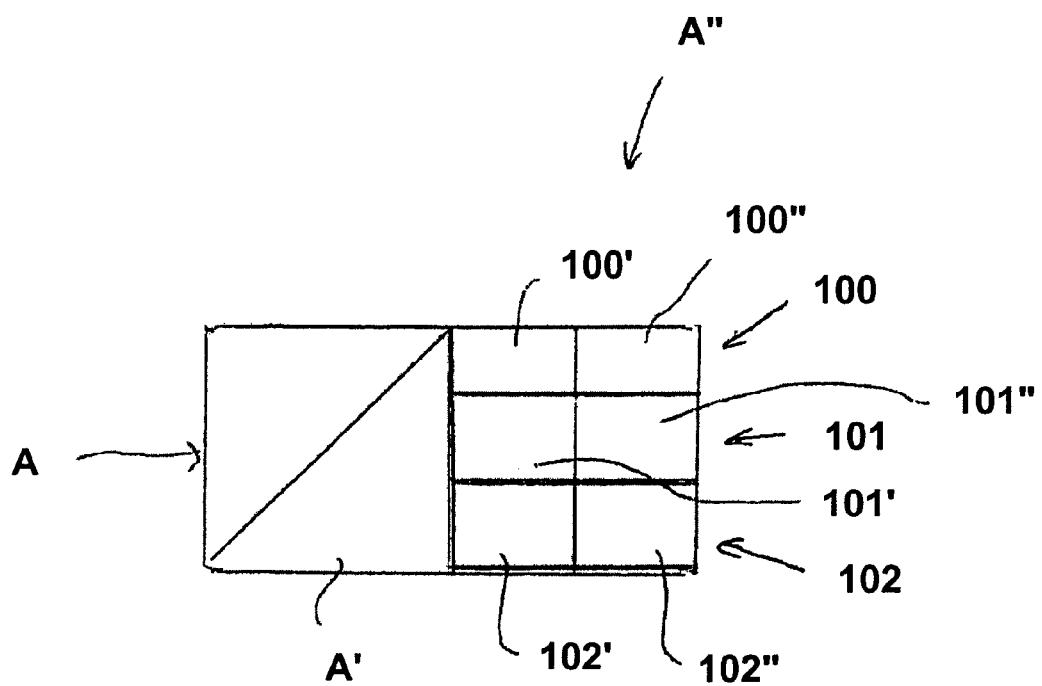
FIG. 7 shows a portion of the generated data structure.

In the next step, one or more corrective measures 100, 101, 102 are assigned to each individual deviation A, B, C, D, E, F (see also FIG. 7 in terms of naming, in which a section from FIG. 6 related to the deviation A is shown in enlarged form).

One or more possible corrective measures can be assigned to each deviation A, B and so forth, which each improve the effect of the deviation on the state and/or the performance of the blade to varying degrees. Ideally, the corresponding corrective measure can establish the target state.

The information regarding an individual corrective measure 100, 101, 102 includes information about the respective measure in the form of a work instruction, such as filling or grinding, wherein these pieces of information in the narrower sense are each denoted by 100', 101', 102', and the corresponding expenditures are denoted by 100", 101", 102". The respective expenditures can be measured in the form of cost expenditures or time expenditures, for example.

At this point, a respective corrective measure can be assigned to each deviation, or also to the prioritized deviations having the highest relevance, wherein the corrective measures having the least expenditure can be selected, for example. If the sum of the deviations exceeds a certain relevance, or the sum of the corrective measures exceeds a certain expenditure, a decision can be made that a repair/correction of the blade is not worthwhile. It is also possible to decide that only a certain limited number of the most important/most relevant deviations is machined since these have the greatest influence on the aerodynamic and/or mechanical properties of the blade.

In addition to the respective degree of the deviation, it is also possible to use the relation of the necessary corrective measures to the deviation evaluation for selecting the deviations that are to be machined. For example, the quotient of an expenditure of a corrective measure and of the evaluation of the deviation may serve as a basis for the decision as to whether or not a certain deviation is dealt with by a correction. Linkages between the correction expenditure and the deviation evaluation other than a direct quotient are also conceivable.

However, the decision can also be made dependent on the extent to which the individual possible corrective measures 100, 101, 102 are able to eliminate the particular deviation. For this purpose, a result state 100′″, 101′″, 102′″ can be assigned to each corrective measure 100, 101, 102, which provides information as to the extent to which the deviation can be eliminated by the respective corrective measure. It is then possible, for example, to select for each deviation the corrective measure which eliminates the deviation to the greatest degree and brings the blade the closest to the target state at the location in question. However, it is also possible to select the corrective measure at which the expenditure/benefit ratio is optimal in terms of the result state.

The determination of potential corrective measures for the respective deviations A, B, C, D, E takes place in the device 23.

Moreover, a linking device 24 is provided, in which the corrective measures optimized according to given criteria, or no corrective measures, are assigned to the respective deviations A, B, C, D, E. The deviations are output together with the proposed corrective measures in the form of a vector 25. In the example provided in FIG. 6, the corrective measure 100 having the expenditure 100″ and the result state 100′″ is assigned to the deviation A. This vector 25 can be used as a work program for a machine tool into which the respective blade can be introduced.

The results of the determined deviations of a series of blades are stored and can be evaluated so as to determine long-term trends in terms of the occurrence of deviations and counteract these.

The invention allows systematic quality assurance, which not only ensures that the finished blades satisfy the quality requirements, but also ensures that the required quality standard can be achieved with minimized expenditure.

The invention claimed is:

1. A method for producing blades of a fluid-driven machine, the method comprising:
   providing or specifying one or more blades that are shaped, geometric deviations from a target shape are determined in an examination step for one or more shaped blades, a respective first deviation evaluation is assigned to one or more determined geometric deviations from the target shape for each blade with respect to at least one of an aerodynamic or a mechanical consequence thereof; and
   one or more corrective measures, each including an expenditure evaluation, are assigned to one or more determined geometric deviations from the target shape for each blade, wherein the one or more determined geometric deviations are in a form of at least one of: an elevation, a depression, or a recess, and for one or more of the determined geometric deviations the deviation evaluation is linked to the expenditure evaluation, and the one or more corrective measures to be carried out are determined from the result of the linkage.

2. The method according to claim 1 wherein a quotient is found of the expenditure evaluation and the deviation evaluation when linking the deviation evaluation to the expenditure evaluation.

3. The method according to claim 1 wherein, in the determination of the deviation evaluation, a difference of an aerodynamic value is assigned to the geometric deviation from the target shape based on an aerodynamic model by way of a differential change.

4. The method according to claim 1 wherein longitudinal sections of a blade are each considered and assessed separately in the deviation evaluation of the geometric deviation from the target shape.

5. The method according to claim 1 wherein the deviation evaluation is indicated in the form of a performance deviation of a wind turbine caused by the geometric deviation from the target shape under one or more defined conditions.

6. The method according to any claim 1 wherein the deviation evaluation is indicated in the form of an added-up energy difference over a defined operating time of a wind turbine caused by the geometric deviation from the target shape.

7. The method according to claim 1 wherein the expenditure evaluation is indicated in the form of a cost expenditure or a time expenditure or a linkage of a time expenditure to a cost expenditure.

8. The method according to claim 1 wherein the respective blade is scanned three-dimensionally in the determination of the geometric deviations from a target shape, and a representation of the blade is stored in a data processing system.

9. The method according to claim 1 wherein thereafter one or more corrections are carried out on at least one of the blades by removing one or more parts of the surface or by applying material.

10. A method for producing blades of a fluid-driven machine, the method comprising:
    providing or specifying one or more blades that are shaped, geometric deviations from a target shape are determined in an examination step for one or more shaped blades, a respective first deviation evaluation is assigned to one or more determined geometric deviations from the target shape for each blade with respect to at least one of an aerodynamic or mechanical consequence thereof,
    one or more corrective measures, each including an expenditure evaluation, are assigned to one or more determined geometric deviations from the target shape for each blade, wherein the one or more determined geometric deviations are in a form of at least one of: an elevation, a depression, or a recess, a respective second deviation evaluation is assigned to determined geometric deviations for each blade with respect to the aerodynamic and/or mechanical consequences thereof, taking the one or more corrective measures into consideration, and
    for one or more of the determined geometric deviations the second deviation evaluation is, or the first and second deviation evaluations are, linked to the expenditure evaluation, and the one or more corrective measures to be carried out are determined from the result of the linkage.

11. The method according to claim 10 wherein a quotient is found of the expenditure evaluation and the deviation evaluation when linking the deviation evaluation to the expenditure evaluation.

12. The method according to claim 10, wherein, in the determination of the deviation evaluation, a difference of an aerodynamic value is assigned to the geometric deviation from the target shape based on an aerodynamic model by way of a differential change.

13. The method according to claim 10 wherein longitudinal sections of a blade are each considered and assessed separately in the deviation evaluation of the geometric deviation from the target shape.

14. The method according to claim 10 wherein the deviation evaluation is indicated in the form of a performance deviation of a wind turbine caused by the geometric deviation from the target shape under one or more defined conditions.

15. The method according to any claim 10 wherein the deviation evaluation is indicated in the form of an added-up energy difference over a defined operating time of a wind turbine caused by the geometric deviation from the target shape.

16. The method according to claim 10 wherein time expenditure or a linkage of a time expenditure to a cost expenditure.

17. The method according to claim 10 wherein the respective blade is scanned three-dimensionally in the determination of the geometric deviations from a target shape, and a representation of the blade is stored in a data processing system.

18. The method according to claim 10 wherein thereafter one or more corrections are carried out on at least one of the blades by removing one or more parts of the surface or by applying material.

19. A method for producing blades of a fluid-driven machine, the method comprising:
providing or specifying multiple blades that are shaped, geometric deviations from a target shape are determined in an examination step for multiple shaped blades, a respective first deviation evaluation is assigned to one or more determined geometric deviations from the target shape for each blade with respect to at least one of an aerodynamic or a mechanical consequence thereof,
one or more corrective measures, each including an expenditure evaluation, are assigned to one or more determined geometric deviations from the target shape for each blade, wherein the one or more determined geometric deviations are in a form of at least one of: an elevation, a depression, or a recess, and
for one or more of the determined geometric deviations the deviation evaluation is linked to the expenditure evaluation, and groups of two or more blades, for which the expenditure evaluation exceeds an established threshold and for which the deviation evaluations differ from one another by less than an established value, are assigned to one another for a shared use in a wind turbine based on the result of the linkage.

20. A system for producing blades of a fluid-driven machine, comprising
an examination device for determining one or more geometric deviations from a target shape for one or more shaped blades,
a device for determining a deviation evaluation of one or more determined geometric deviations from the target shape for each blade with respect to one or more of an aerodynamic or a mechanical consequence thereof,
a device for assigning one or more corrective measures, each including an expenditure evaluation, to one or more determined geometric deviations from the target shape for each blade, wherein the one or more determined geometric deviations are in a form of at least one of: an elevation, a depression, or a recess, and
a linking device for linking a deviation evaluation of one or more of the determined geometric deviations to the expenditure evaluation for one or more determined corrective measures and for determining the one or more corrective measures to be carried out from the result of the linkage.

* * * * *